United States Patent
Nguyen et al.

(10) Patent No.: US 8,553,381 B2
(45) Date of Patent: Oct. 8, 2013

(54) GRADUALLY REDUCING RESISTIVE CLAMP

(75) Inventors: Vietson M. Nguyen, Rockford, IL (US);
John D. Sagona, Poplar Grove, IL (US);
Waleed M. Said, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 33 days.

(21) Appl. No.: 13/117,181

(22) Filed: May 27, 2011

(65) Prior Publication Data

US 2012/0300350 A1 Nov. 29, 2012

(51) Int. Cl.
*H02H 9/00* (2006.01)
*H02H 3/20* (2006.01)
*H02H 9/04* (2006.01)
*H02H 3/22* (2006.01)

(52) U.S. Cl.
USPC .............................. 361/56; 361/91.1; 361/111

(58) Field of Classification Search
USPC .......................................... 361/56, 91.1, 111
See application file for complete search history.

(56) References Cited

U.S. PATENT DOCUMENTS

| | | | |
|---|---|---|---|
| 4,020,395 A | 4/1977 | Erickson et al. | |
| 4,271,446 A * | 6/1981 | Comstock | 361/56 |
| 4,860,150 A | 8/1989 | Epstein | |
| 5,038,245 A * | 8/1991 | Gronskog | 361/56 |
| 5,309,309 A * | 5/1994 | Weber | 361/18 |
| 5,534,771 A | 7/1996 | Massie | |
| 5,646,810 A | 7/1997 | Funke | |
| 6,088,209 A * | 7/2000 | Sink | 361/111 |
| 6,393,354 B1 | 5/2002 | Scheffler et al. | |
| 6,922,322 B2 | 7/2005 | Strayer et al. | |
| 7,087,329 B2 | 8/2006 | Converse et al. | |
| 7,254,000 B1 | 8/2007 | Smith et al. | |
| 7,339,776 B1 | 3/2008 | Hertel et al. | |
| 7,518,846 B1 | 4/2009 | Meyer | |
| 7,843,676 B2 | 11/2010 | Klikic et al. | |
| 7,869,176 B2 | 1/2011 | Davison | |

FOREIGN PATENT DOCUMENTS

| | | |
|---|---|---|
| DE | 19811269 | 10/1999 |
| EP | 1058366 | 12/2000 |

OTHER PUBLICATIONS

European Search Report dated Dec. 11, 2012 for European Application No. 12169660.3.

* cited by examiner

*Primary Examiner* — Dharti Patel

(74) *Attorney, Agent, or Firm* — Carlson, Gaskey & Olds P.C.

(57) ABSTRACT

A voltage spike protection system minimizes a voltage spike by connecting a resistive clamp to a power source when the voltage spike is detected. The voltage spike detection system disconnects the resistive clamp after a portion of the voltage spike is dissipated.

14 Claims, 3 Drawing Sheets

GRADUALLY REDUCING RESISTIVE CLAMP

BACKGROUND

The present application is directed to overvoltage protection, and in particular to a system and method for reducing voltage spikes.

In electrical power systems, and particularly in aircraft power system where the power frequency is high, switching from a high load condition to a no load condition, as can occur when a load is removed, or from a short circuit load condition to a no load condition, as can occur when a short circuit condition is removed, leads to a voltage spike that can exceed a rated voltage range of the power system. Such a voltage spike is referred to as an overvoltage. Energy resulting from the voltage spike must be dissipated somewhere in the power system during a transient period until the power system can be brought back to normal operating conditions (i.e., the power system voltage returns to within the normal rated voltage range). If the energy is dissipated in currently existing components, the resultant heat and other stresses can damage power system components connected to the electrical system.

SUMMARY

A method for minimizing a voltage spike includes the steps of connecting a resistive clamp to a three phase power source when a voltage spike is detected, and disconnecting the resistive clamp from the three phase power source after at least a portion of the energy that created the voltage spike is safely dissipated within the resistive clamp network.

A voltage spike protection system has a first resistive clamp network having at least one stage, and a controller capable of causing the first resistive clamp to be connected to a power source when a voltage spike is detected.

An electrical system has a power source, a standard load connected to the power source, a controller having at least a voltage sensor for detecting a voltage spike in the power system, and a resistive clamp switchably coupled to the power source such that the controller can connect the resistive clamp to the power source when the controller detects a voltage spike.

These and other features of the present invention can be best understood from the following specification and drawings, the following of which is a brief description.

DETAILED DESCRIPTION

Figure 1:
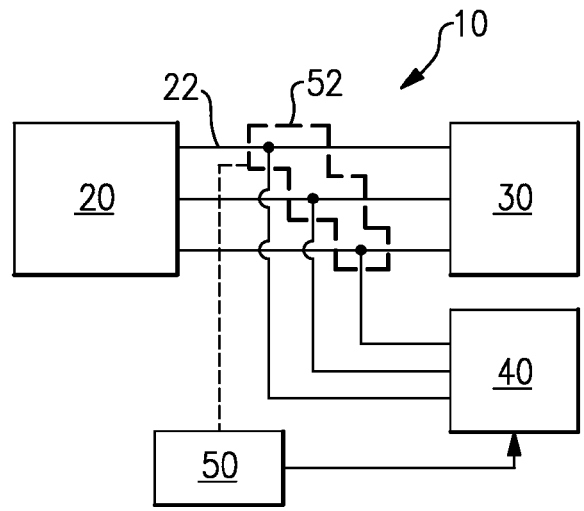
FIG. 1 illustrates an example electrical system having a resistive clamp.

FIG. 1 illustrates an example power system 10 having a power source 20 capable of outputting three phase power via three phase power connections 22 to a primary load 30 and a resistive clamp 40. The primary load 30 can be any type of electrical load conforming to industry standards and is referred to as a "standard load." The power connection 24 between the resistive clamp 40 and the power system 10 is controlled via an overvoltage transient controller 50. The controller 50 is connected to the power system 10 via a voltage sensor 52 which can be combined with other electronic circuit components to detect the occurrence of a voltage spike. The voltage is often measured at the point of regulation of the aircraft generator, but it can be alternately measured at a load point far away from the power source 20. Any voltage detection means can be used for voltage sensor 52 and controller 50.

When the voltage sensor 52 detects a voltage spike, the controller 50 determines that a sudden shift from a heavy or short-circuit load to no load has occurred and switches on the resistive clamp 40. The presence of the resistive clamp 40 in the power system 10 restores a heavy load condition to the power source 20 after the sudden change from a heavy load to no load, thereby minimizing the resulting voltage spike. The resistive clamp 40 further allows the safe dissipation of energy resulting from the voltage spike within resistive clamp elements, rather than other components of the power system 10.

Figure 2:
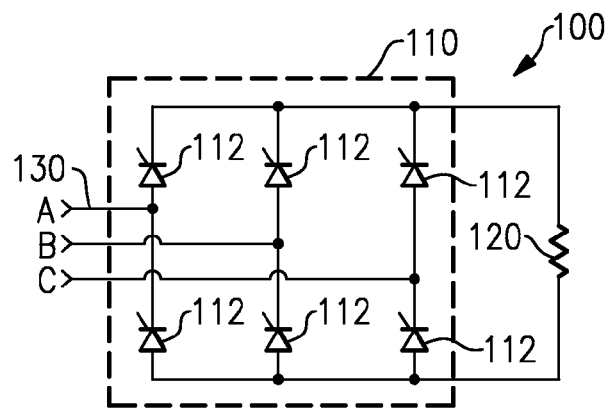
FIG. 2 illustrates a single stage DC resistive clamp.

FIG. 2 illustrates an example single stage resistive clamp circuit 100 that can be used as the resistive clamp 40 of FIG. 1. The single stage resistive clamp circuit 100 includes a silicon controlled rectifier (SCR) bridge 110, which is constructed of SCRs 112, and outputs DC power to a resistor 120. A three phase power input 130 provides power to the SCR bridge 110. The power input 130 is switched on or off by the controller 50, illustrated in FIG. 1, according to known principles, thereby allowing for the resistive clamp circuit 100 to be switched on when a sudden load reduction occurs.

When the resistive clamp circuit 100 is switched on, AC power from the power source 20 is controlled and rectified by the SCR bridge 110. The resultant DC power is allowed to flow through the resistor 120 by the SRCs 112. The resistor 120 dissipates energy from the voltage spike. After energy from the voltage spike is dissipated for a short period, the resistive clamp circuit 100 is switched off. When switching the single stage resistive clamp circuit 100 off, the SCR gate signals are removed. Each SCR 112 does not turn off instantly at the time of gate signal removal, but only after its conducting current reaches zero. However, the removal of the resistive clamp circuit 100 may still cause a similar high load to no load voltage spike, although at a smaller magnitude.

Figure 3:
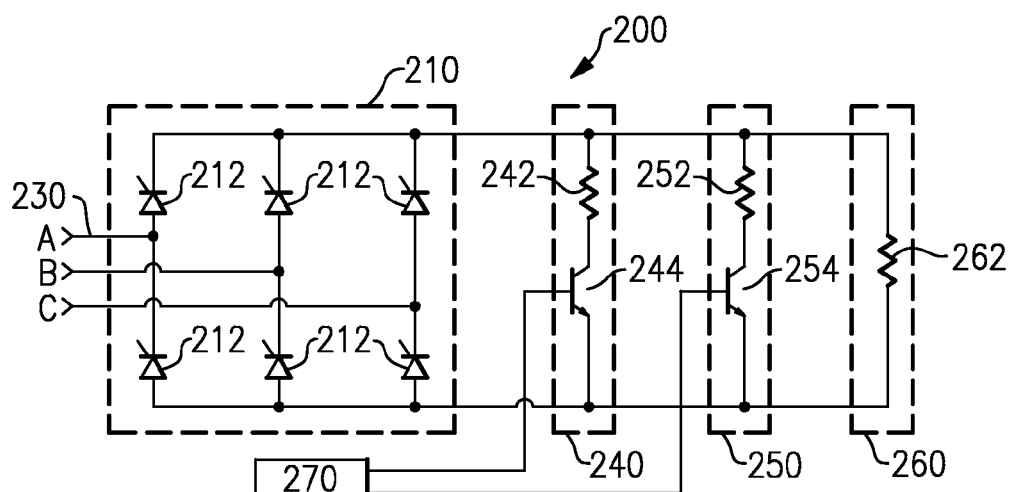
FIG. 3 illustrates a three stage DC resistive clamp.

FIG. 3 illustrates an example three stage resistive clamp circuit 200 that can be used as the resistive clamp 40 of FIG. 1. The three stage resistive clamp circuit 200 includes an SCR bridge 210, having SCRs 212, configured in the same manner as the SCR bridge 110 of the single stage resistive clamp circuit 100 illustrated in FIG. 2. Connected to the output of the SCR bridge 210, however, are three resistive clamp stages 240, 250, 260.

Two of the illustrated resistive clamp stages 240, 250 of FIG. 3 include a power switching device (represented as a power semiconductor switch) 244, 254 that is capable of switching off the corresponding resistive clamp stage 240, 250 without switching off the entire resistive clamp circuit 200. Each of the resistive clamp stages 240, 250, 260 includes a resistor 242, 252, 262 providing the resistive clamp element of the resistive clamp stage 240, 250, 260. Each of the transistors 244, 254 is controlled by a controller 270. By way of example, the controller 270 can be the controller 50 illustrated in FIG. 1.

When the controller 270 detects a voltage spike, the controller 270 switches on the resistive clamp circuit 200, turns on all SCRs in the SCR bridge 210, and turns on each of the power switching devices 244, 254 approximately simultaneously. Thus the resistive clamp circuit 200 restores a heavy load status to the electrical system and begins to dissipate energy from the voltage spike, in much the same manner as the example embodiment of FIG. 2.

Shortly after the resistive clamp circuit 200 is switched on, the first resistive clamp stage 240 is switched off via turning off the associated power device 244. By switching only a single resistive clamp stage 240 off, the overall load of the resistive clamp circuit 200 is reduced by a small amount (the amount of the resistor 242) rather than the full amount of the resistive clamp circuit 200, thus preventing a second voltage spike from occurring due to a large sudden load shift.

Likewise, the second resistive load stage 250 is switched off a short time after the first resistive clamp stage 240 is switched off, and finally the third resistive load stage 260 is switched off by turning off the SCR bridge 210, disconnecting the entire resistive clamp circuit 200 from the power source 20. In this way, the clamp resistance seen by the power source 20, illustrated in FIG. 1, is gradually reduced, rather than suddenly reduced, thereby preventing a reoccurrence of the voltage spike and allowing the excess energy resulting from the voltage spike to be dissipated within the resistive clamp elements 242, 252, 262. In one example embodiment, the time delay between turning on all SCRs and power switches and disconnecting the first resistive clamp stages is about 20 ms. The time delay between disconnecting the first resistive clamp stage 240 and the second resistive clamp stage 260 is also about 20 ms. Likewise, the time delay between second resistive clamp stage 250 and the third resistive clamp stage 260 is about 20 ms. Alternately, any suitable time delay can be used between each switching step.

While three resistive clamp stages 240, 250, 260 are illustrated in the example of FIG. 3, an alternate number of sequentially disconnecting resistive clamp stages 240, 250, 260 can be used to the same effect.

In an alternate example of the circuits of FIGS. 2 and 3, a portion of the SCRs 112, 212 can be replaced with standard diodes. In particular, the top row of SCRs 112, 212 can be replaced with diodes or the bottom row can be replaced with diodes. In each of the alternate examples, however, either the top row of SCRs 112, 212 or the bottom row of SCRs 112, 212 must remain SCRs in order to retain functionality.

Figure 4:
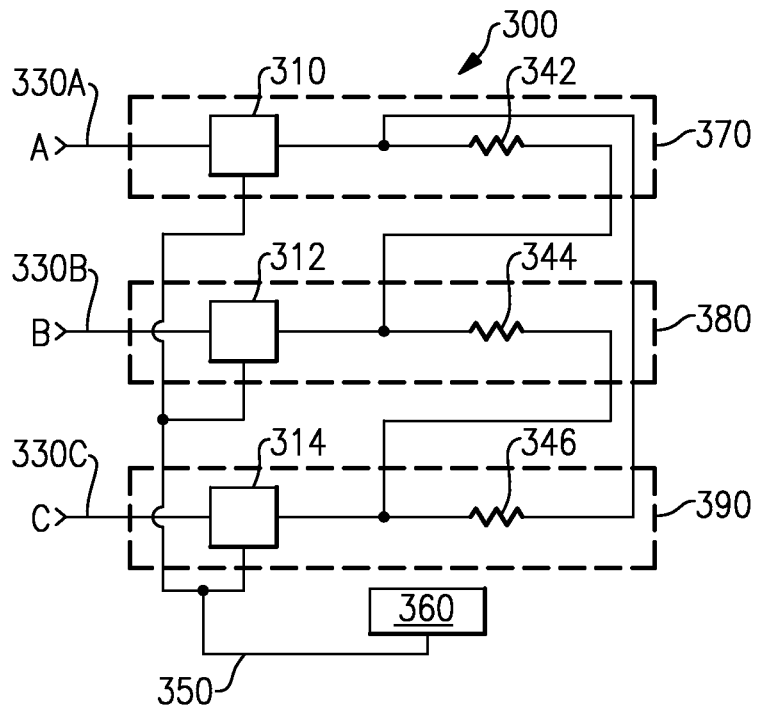
FIG. 4 illustrates a three stage AC resistive clamp, using a delta resistor configuration.
Figure 5:
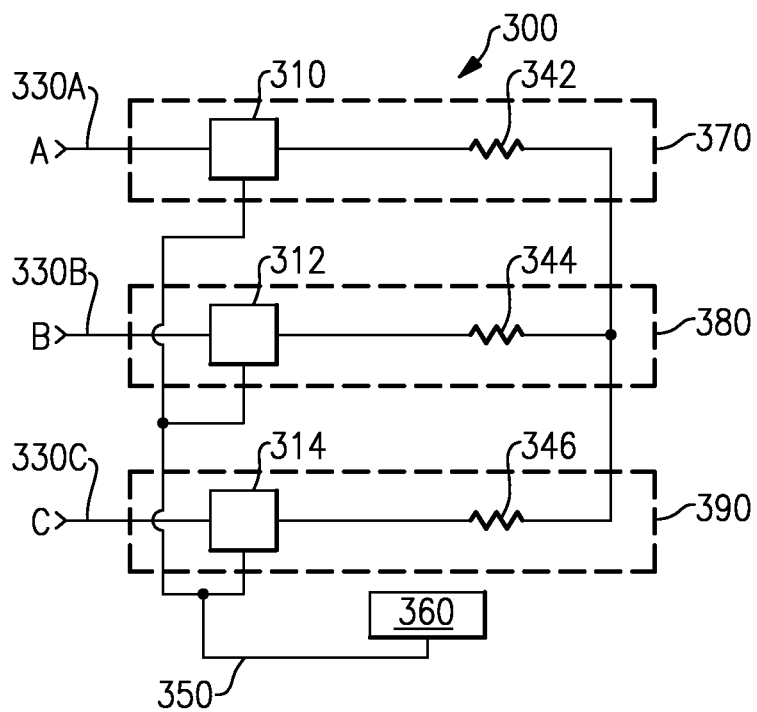
FIG. 5 illustrates a three stage AC resistive clamp, using a Y resistor configuration.

FIG. 4 illustrates an alternate example three phase resistive clamp circuit 300 that can be used as the resistive clamp 40 of FIG. 1. Contrary to the examples illustrated in FIGS. 2 and 3, the example resistive clamp circuit 300 of FIG. 4 operates using three phase power, and thus omits the SCR bridge 110, 210 included in each of the previously described examples. The three phase resistive clamp circuit 300 includes three resistive clamp stages 370, 380, 390 each corresponding to one phase of input power 330A, 330B, 330C from the power source 20, illustrated in FIG. 1. Each of the resistive clamp stages 370, 380, 390 includes a standard electrical triac 310, 312, 314 and a resistive clamp element 342, 344, 346 such as a resistor. Each of the resistive clamp elements 342, 344, 346 is connected to each of the other resistive clamp elements 342, 344, 346 in a Delta configuration. Alternately, the three clamp resistors 342, 344, 346 can be connected in a Y-configuration. The Y-configuration is illustrated in FIG. 5, with like numerals indicating like elements. Each of the triacs 310, 312, 314 has a control input 350 provided by a controller 360. The controller 360 can be the controller 50 illustrated in FIG. 1, or an independent controller for controlling the resistive clamp circuit 300.

When a voltage spike is detected, all of the triacs 310, 312, 314 are turned on by the controller at the same time 360 thereby allowing power to flow through each of the resistive clamp stages, 370, 380, 390 and activating the resistive clamp circuit 300. Once turned on, each triac 310, 312, 314 remains on until current passing through each of the triacs 310, 312, 314 falls to a value ideally equal zero or a little bit below zero. Once the current in a particular resistive clamp stage 370, 380, 390 falls to equal to or slightly below zero, the triacs 310, 312, 314 turn off by themselves, removing the corresponding resistive clamp element 342, 344, 346 from the resistive clamp circuit 300. The triac circuits (illustrated in FIGS. 4 and 5) are described in an ideal condition where the amount of the energy of the voltage spike can be predicted, thus the value of the clamp resistors as well a the exact time of turning off the triacs can be precisely calculated. In practice, the amount of energy at each voltage spike condition can vary significantly and predicting the resistor value and the turn off time is exceedingly complicated.

Figure 6:
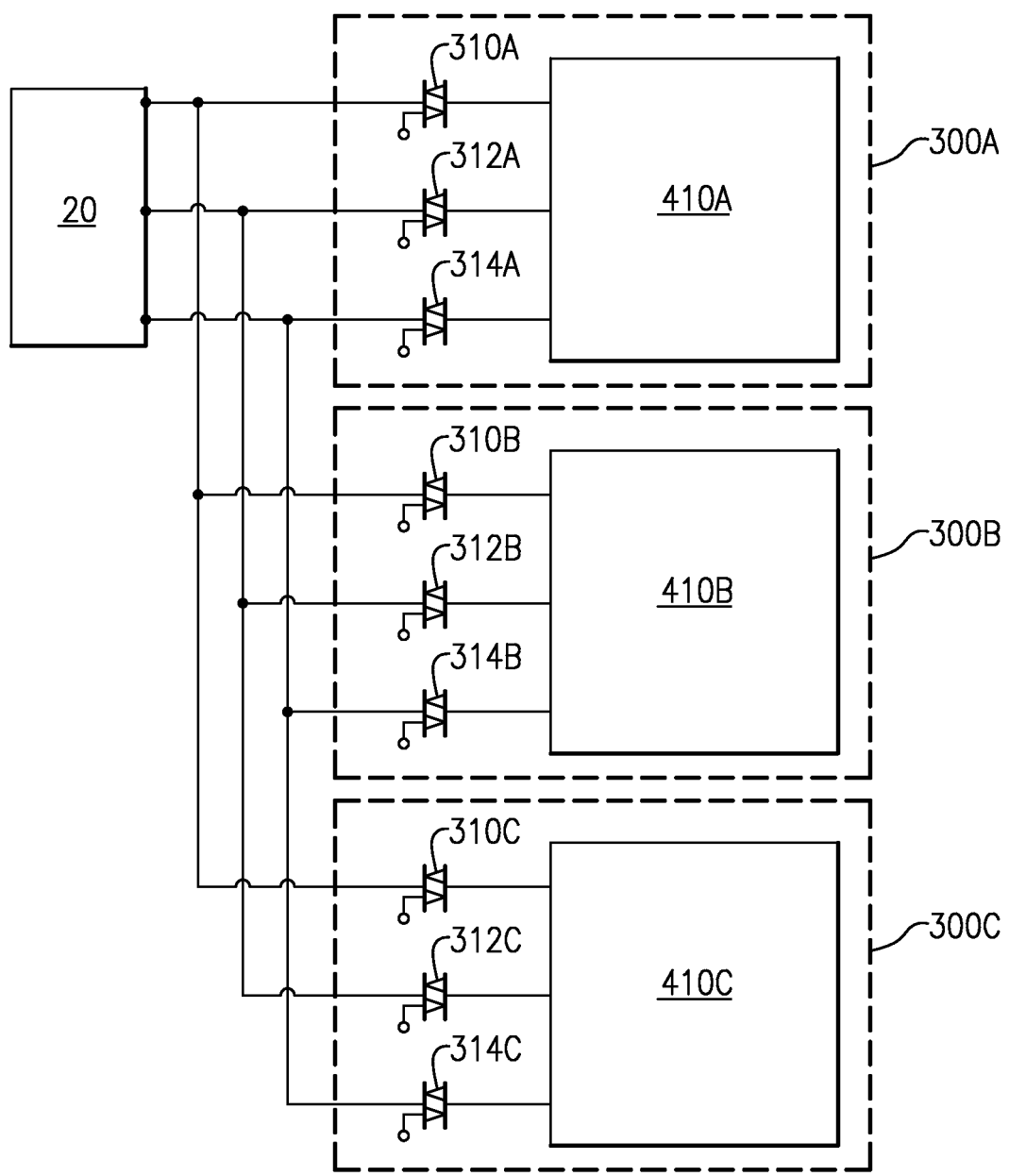
FIG. 6 illustrates multiple three stage AC resistive clamps connected in parallel.

FIG. 6 illustrates a practical circuit implementing gradually reducing resistive clamp action using multiple triac-and-resistor blocks 300 connected in parallel. While FIG. 6 illustrates using three triac and resistor blocks 300, it is understood that additional triac-and-resistor blocks 300 can also be used to the same affect. Each of the triac-and-resistor blocks 300 includes a triac 310, 312, 314 on each phase and a resistor bank 410. The resistor bank 410 can be connected in a delta configuration as in the example circuit of FIG. 4, or in a Y configuration as in the example circuit of FIG. 5.

Operation of the power circuit of FIG. 6 is similar to operation of the power circuit of FIG. 3. Initially, after detecting an overvoltage condition, the controller sends a common signal to turn on all the triacs in all three triac-and-resistor blocks 300A, 300B, 300C of FIG. 6, thus connecting all resistive components to the source approximately simultaneously. Next, one triac-and-resistor block 300A is removed after a time period by turning off the corresponding triacs 310A, 312A, 314A, thus reducing a first portion of the resistive clamp. Next, a second triac-and-resistor block 300B is removed after another period by turning off the corresponding triacs 310B, 312B, 314B, thus further reducing another portion of the resistive clamp. After another period, the last portion of the resistive clamp is removed by turning off the corresponding triacs 310C, 312C, 314C.

If correctly designed, with a specific value of the resistor and a specific value for the turn-off time, any overvoltage phenomenon in a given generator can be removed after three switching steps as described above. The principle, however, can be expanded to use multiple additional triac-and-resistors blocks 300 connected in parallel.

In one example, the time delay between applying the same turn-on signals to all triac-and-resistor blocks 300A, 300B, 300C until disconnecting the first triac-and-resistor block 300A is about 20 ms. The time delay between disconnecting the first triac-and-resistor block 300A and the second triac-and-resistor block 300B is about 20 ms. Likewise, the time delay between disconnecting the second triac-and-resistor block 300B and the third triac-and-resistor block 300C is about 20 ms. Alternately, any suitable time delay can be used between each switching step.

While the examples of FIGS. 2, 3, 4, 5, and 6 illustrate a single resistor in each resistive clamp stage, it is understood that the resistor can alternately be a resistor bank incorporating multiple individual resistors or any resistive load element and still fall within the above disclosure.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A method for minimizing a voltage spike comprising the steps of:
    connecting a resistive clamp to a three phase power source using a circuit selected from a group of circuits consisting of a silicon controlled rectifier (SCR) bridge and a set of triacs when a voltage spike is detected; and
    disconnecting said resistive clamp from said three phase power source after at least a portion of said voltage spike is dissipated within said resistive clamp;
    wherein said resistive clamp comprises multiple resistive clamp stages; and
    wherein said step of disconnecting said resistive clamp from said three phase power source comprises disconnecting each resistive clamp stage individually.

2. The method of claim 1, wherein said resistive clamp stages are disconnected from said three phase power source sequentially and wherein a time-delay is present between each sequential disconnection.

3. The method of claim 2, wherein said time delay is predetermined.

4. The method of claim 3, wherein said time delay is about 20 ms.

5. The method of claim 1, wherein the step of connecting each stage of said resistive clamp to said three phase voltage source approximately simultaneously comprises sending a common activation signal to a plurality of sets of triacs, thereby causing each of said plurality of sets of triacs to connect a corresponding resistive clamp stage to said three phase voltage source.

6. The method of claim 5, wherein the step of disconnecting said resistive clamp from said three phase power source further comprises removing said activation signal from each of said plurality of sets of triacs sequentially.

7. The method of claim 6, wherein removing said activation signal from each of said plurality of sets of triacs sequentially comprises a time delay between removing an activation signal from a first set of triacs corresponding to a first stage and removing an activation signal from a second set of triacs corresponding to a second stage.

8. A voltage spike protection system comprising:
    a first resistive clamp having at least one stage;
    a controller capable of causing said first resistive clamp to be connected to a power source through a circuit selected from a group of circuits consisting of silicon controlled rectifier (SCR) bridge and a set of triacs when a voltage spike is detected;
    wherein said first resistive clamp comprises a plurality of resistive clamp stages; and
    wherein at least a portion of said resistive clamp stages comprises a switching element operable to individually remove one of said resistive clamp stages from said resistive clamp.

9. The voltage spike protection system of claim 8, wherein each of said switching elements comprises a power semiconductor switch, and wherein each of said power semiconductor switches is controllably coupled to said controller.

10. The voltage spike protection system of claim 8, wherein each of said switching elements comprises a set of triacs.

11. The voltage spike protection system of claim 10, wherein each of said sets of triacs is controllably coupled to said controller such that said controller is operable to activate each of said sets of triacs.

12. The voltage spike protection system of claim 8, wherein each of said sets of triacs latches closed when activated and opens when a current passing through each triac in said set of triacs falls to approximately zero amps.

13. An electrical system comprising:
    a power source;
    an electrical load connected to said power source;
    a controller having at least a voltage sensor for detecting a voltage spike in said power source;
    a resistive clamp switchably coupled to said power source such that said controller can connect said resistive clamp to said power source using a circuit selected from a group of circuits consisting of a silicon controlled rectifier (SCR) bridge and a set of triacs when said controller detects a voltage spike;
    said resistive clamp comprising a plurality of resistive clamp stages; and
    at least a portion of said resistive clamp stages comprises a switching element operable to individually remove one of said resistive clamp stages from said resistive clamp.

14. The electrical system of claim 13, wherein said resistive clamp further comprises a plurality of individually connectible clamp stages.

* * * * *